US011920458B2

(12) United States Patent
Ortiz et al.

(10) Patent No.: US 11,920,458 B2
(45) Date of Patent: Mar. 5, 2024

(54) WINDOW CORE FOR GAMMA RAY DETECTION IN A DOWNHOLE TOOL

(71) Applicant: Halliburton Energy Services, Inc., Houston, TX (US)

(72) Inventors: Ricardo Ortiz, Houston, TX (US); Minh Dang Nguyen, Cypress, TX (US)

(*) Notice: Subject to any disclaimer, the term of this patent is extended or adjusted under 35 U.S.C. 154(b) by 372 days.

(21) Appl. No.: 17/309,865

(22) PCT Filed: Aug. 18, 2020

(86) PCT No.: PCT/US2020/046765
§ 371 (c)(1),
(2) Date: Jun. 24, 2021

(87) PCT Pub. No.: WO2022/039722
PCT Pub. Date: Feb. 24, 2022

(65) Prior Publication Data
US 2022/0316315 A1 Oct. 6, 2022

(51) Int. Cl.
*E21B 47/017* (2012.01)
*E21B 49/00* (2006.01)
*G01V 5/12* (2006.01)

(52) U.S. Cl.
CPC ............ *E21B 47/017* (2020.05); *E21B 49/00* (2013.01); *G01V 5/12* (2013.01)

(58) Field of Classification Search
CPC .... E21B 49/0875; E21B 49/005; E21B 47/01; E21B 47/113; E21B 47/013; E21B 49/00; E21B 49/003; E21B 49/081; E21B 49/08; E21B 47/13
See application file for complete search history.

(56) References Cited

U.S. PATENT DOCUMENTS

| 2,060,593 A | 11/1936 | Schaurte et al. |
| 2,341,469 A | 2/1944 | Park |
| 4,050,494 A | 9/1977 | De Claire |
| 4,258,607 A | 3/1981 | McKewan |

(Continued)

FOREIGN PATENT DOCUMENTS

| EP | 0160351 A1 | 11/1985 |
| EP | 0206867 A1 | 7/1990 |
| WO | 2012074834 A2 | 7/2012 |

OTHER PUBLICATIONS

"PCT Application No. PCT/US2020/046765, International Preliminary Report on Patentability", dated Mar. 2, 2023, 7 pages.

(Continued)

*Primary Examiner* — Zakiya W Bates
(74) *Attorney, Agent, or Firm* — DeLizio, Peacock, Lewin & Guerra, LLP

(57) ABSTRACT

A downhole tool includes a window cap located in a cover that is positioned between an electromagnetic radiation detector in the downhole tool and a geological formation into which a borehole is formed and where the downhole tool is to be positioned. The electromagnetic radiation detector is to detect an electromagnetic radiation from the geological formation. The downhole tool includes a window core positioned behind the window cap relative to an external environment of the downhole tool, wherein the window core is positioned between the window cap and the electromagnetic radiation detector.

20 Claims, 17 Drawing Sheets

(56) References Cited

U.S. PATENT DOCUMENTS

| | | | |
|---|---|---|---|
| 4,338,054 | A | 7/1982 | Dahl |
| 4,436,443 | A | 3/1984 | McCormick |
| 4,637,764 | A | 1/1987 | Imai |
| 4,877,364 | A | 10/1989 | Sorrentino |
| 4,941,337 | A | 7/1990 | Emery |
| 5,433,570 | A | 7/1995 | Koppel |
| 5,782,595 | A | 7/1998 | Schneider |
| 5,796,109 | A | 8/1998 | Frederick et al. |
| 5,954,466 | A | 9/1999 | Coffey et al. |
| 6,125,526 | A | 10/2000 | Wierzchon |
| 6,264,414 | B1 | 7/2001 | Hartmann et al. |
| D548,579 | S | 8/2007 | Gaudron |
| 9,897,718 | B2 | 2/2018 | Mauborgne et al. |
| D814,280 | S | 4/2018 | Tarbell et al. |
| D847,595 | S | 5/2019 | Hampton |
| D887,259 | S | 6/2020 | Schwarzmann et al. |
| D887,825 | S | 6/2020 | Schwarzmann et al. |
| D903,476 | S | 12/2020 | Schwarzmann et al. |
| D915,876 | S | 4/2021 | Schwarzmann et al. |
| D990,299 | S | 6/2023 | Nguyen et al. |
| 2002/0197130 | A1 | 12/2002 | Ozawa et al. |
| 2004/0265090 | A1 | 12/2004 | Stone |
| 2005/0089385 | A1 | 4/2005 | Lin |
| 2005/0207869 | A1 | 9/2005 | Haas |
| 2006/0102834 | A1* | 5/2006 | Mickael .................. G01V 5/08 250/269.1 |
| 2009/0104001 | A1 | 4/2009 | Kochheiser |
| 2009/0110478 | A1 | 4/2009 | Schneider |
| 2011/0204216 | A1 | 8/2011 | Moake et al. |
| 2012/0034046 | A1 | 2/2012 | Cooper et al. |
| 2014/0321943 | A1 | 10/2014 | Mair et al. |
| 2015/0192167 | A1 | 7/2015 | Harris et al. |
| 2016/0003969 | A1 | 1/2016 | Zhou et al. |
| 2016/0320521 | A1 | 11/2016 | Mauborgne et al. |
| 2017/0363129 | A1 | 12/2017 | Bada |
| 2018/0087555 | A1 | 3/2018 | Owens et al. |
| 2019/0203326 | A1 | 7/2019 | Wingen et al. |
| 2019/0338802 | A1 | 11/2019 | Poster |
| 2021/0156245 | A1* | 5/2021 | Neely .................. E21B 47/017 |

OTHER PUBLICATIONS

"SA Application No. 121430041, First Examination Report", dated Jun. 22, 2023, 12 pages.

"U.S. Appl. No. 29/746,889, Ex Parte Quayle", filed Jun. 13, 2022, 5 pages.

U.S. Appl. No. 29/746,885, Non-Final Office Action, dated Dec. 8, 2021, 9 pages.

U.S. Appl. No. 29/746,889; Restriction Requirement; dated Sep. 16, 2021, 7 pages.

U.S. Appl. No. 29/746,885; Restriction Requirement; dated Sep. 15, 2021, 8 pages.

PCT Application No. PCT/US2020/046765; PCT Search Report: dated May 3, 2021, 3 pages.

PCT Application No. PCT/US2020/046765; PCT Written Opinion: dated May 3, 2021, 5 pages.

"Bolts with waisted shanks put rail company back on track", [online] retrieved on Jun. 16, 2020 from https://www.engineerlive.com/content/bolts-waisted-shanks-put-rail-company-back-track, Feb. 1, 2013.

"The Benefits of Bolt Shanks", [online] retrieved on Jun. 16, 2020 from https://www.nord-lock.com/insights/bolting-tips/2015/benefits-of-bolt-shanks/, Mar. 19, 2015.

* cited by examiner

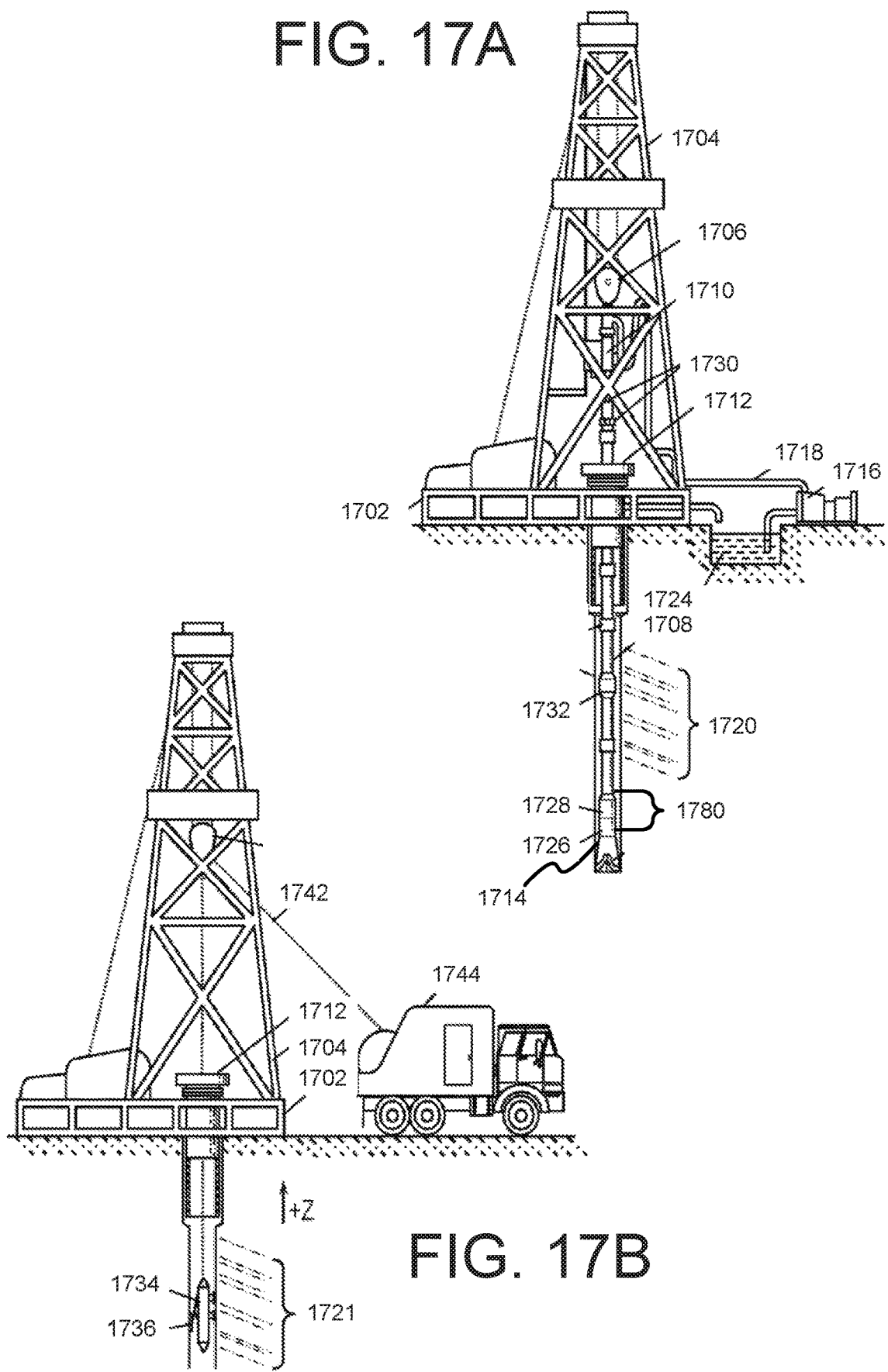

WINDOW CORE FOR GAMMA RAY DETECTION IN A DOWNHOLE TOOL

TECHNICAL FIELD

This disclosure generally relates to gamma ray density measurement logging, and, in particular, to a window core for gamma ray detection in a downhole tool.

BACKGROUND

Gamma ray scattering measurements can be used to measure the density of subsurface formations. Downhole tools can include a gamma ray source and at least one gamma ray detector. Gamma rays from the source can pass into a subsurface formation surrounding the borehole. These gamma rays can interact with electrons in the formation material. Some of the gamma rays eventually scatter back into the tool and can be detected by a gamma ray detector. The number of detected gamma rays can depend on the number of electrons in the formation, and the number of electrons can be proportional to the density of the formation. Consequently, the formation density can be determined from the number of detected gamma rays.

BRIEF DESCRIPTION OF THE DRAWINGS

Embodiments of the disclosure may be better understood by referencing the accompanying drawings.

FIG. 17A is a schematic diagram of an example drilling system, according to some embodiments.

FIG. 17B is a schematic diagram of an example wireline system, according to some embodiments.

DESCRIPTION OF EMBODIMENTS

Figure 1:
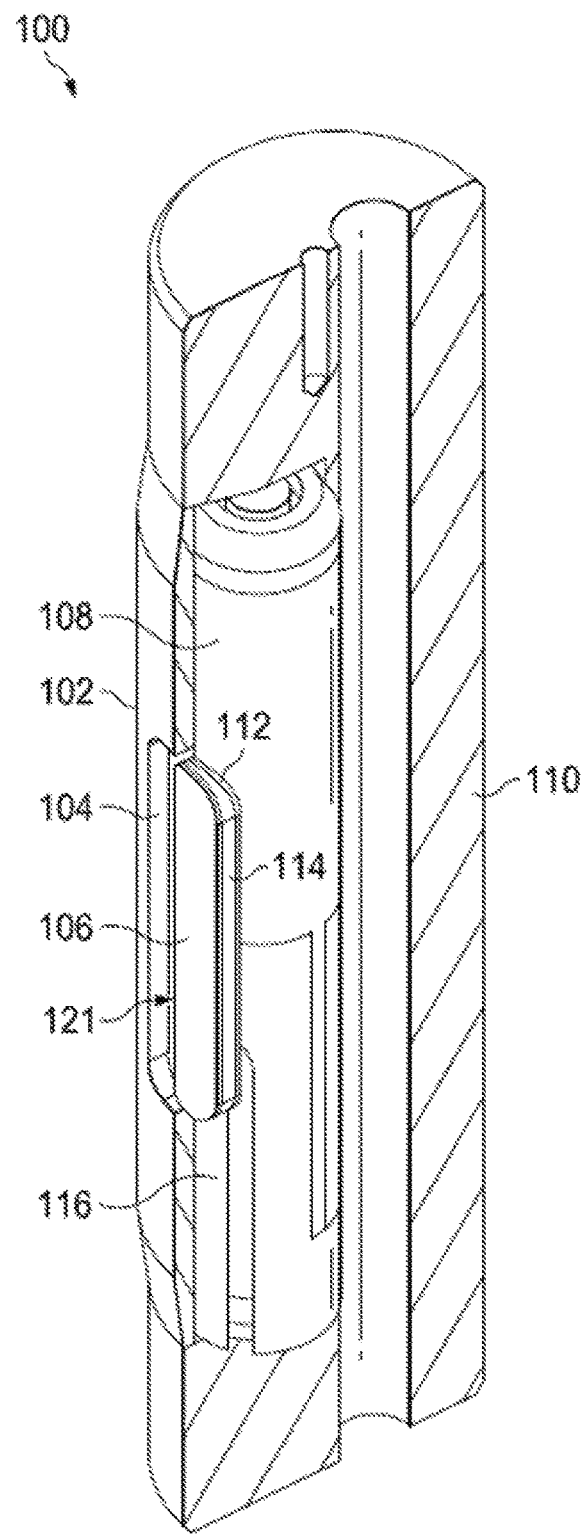
FIG. 1 is an isometric view of a first example downhole tool, according to some embodiments.

The description that follows includes example systems, methods, techniques, and program flows that embody embodiments of the disclosure. However, it is understood that this disclosure may be practiced without these specific details. For instance, this disclosure refers to the use of a gamma ray detector for detection of gamma rays in illustrative examples. Embodiments of this disclosure can also be used to detect other types of electromagnetic radiation. In other instances, well-known instruction instances, protocols, structures, and techniques have not been shown in detail in order not to obfuscate the description.

Nuclear logging tools can be used to measure the interactions between radiation emitted from such tools and the surrounding formation during various downhole operations. Tools having gamma ray detectors can be used to measure various formation properties (such as formation porosity, lithology, etc.). Gamma ray detectors are typically mounted in a housing internal to the tool housing. A separate cover can be attached to the tool housing to cover the opening and protect the detector from rough downhole conditions and borehole impact. A window can be cut in the cover in front of the gamma ray detector to allow for the unattenuated transmission and receipt of formation gamma rays. In order to maintain consistent and accurate measurement, various contaminants (such as downhole mud, drilling fluid, cuttings, etc.) entering the detection window should be avoided.

Example embodiments include a gamma ray logging tool that is configured to provide a more accurate measurement of gamma rays by reducing interference of the measurement that can be caused by these various contaminants downhole. For example, in Measurement While Drilling (MWD) or Logging While Drilling (LWD) applications, the legacy mud-under-the-blade issue for gamma ray logging tools can be reduced. Multiple factors can contribute to contaminants being introduced into the gamma ray detection window. First, conventional detection windows are typically composed of a plastic material due to its low density to prevent the gamma ray blockage. However, this plastic material is soft and thus can be prone to be damaged under rough downhole conditions and borehole impact. Second, under high pressure downhole, mud can penetrate into multiple gaps under the detection window and can enlarge that gap overtime. Further, thermal expansion of these detection windows can occur as a result of the downhole conditions during operations. These phenomena can change the integrity of detection window during downhole operations and can deteriorate the measurement accuracy. As a result, the tool may require calibration after each run. However, these problems with inaccurate measurements caused by various contaminants downhole can continue to occur and worsen over time.

The challenges noted above can be addressed by the various embodiments of a detector housing described herein. In some embodiments, a window core is positioned between a window cap and the detector. The window core can include a first elastic material disposed adjacent to a back side of the window cap facing the detector. The window core can also include a second elastic material disposed adjacent to a part of the detector to receive the gamma rays through the window cap and that is facing the window. By using these elastic materials with sealing capability in the area between the window and the detector, the ingress of contaminants during downhole operations can be prevented. In some embodiments, the window core can include a plastic material positioned between the two elastic materials. This plastic material can reduce the thermal expansion of the window core when temperature increases downhole during operations. In some embodiments, the window core can be combined with a sleeve that wraps around the detector. In some embodiments, other sides of the window core can include elastic materials to further increase its sealing capability. Alternatively, the window core may not include a plastic material positioned between the elastic materials. Rather, the window core can be composed of elastic material. In some implementations, the window cap may be eliminated, and the cover may have a cavity in which the window core may be placed.

In some embodiments, fasteners can be used to securely couple or connect parts of the logging tool together. As further described below, the fasteners can be bolts that are configured to reduce stress concentration on the bolts that can be caused by a bending and/or axial load during downhole operations. In some embodiments, a shank of the bolt may have a smaller diameter than a diameter of the threads. There may be multiple diameters along the shank. There may also be a multi-radii fillet between a bolt head and the shank. In some embodiments, anti-rotation assemblies may be used in conjunction with the fasteners described herein to prevent loosening of the fasteners due to high vibrations during downhole operations.

Example Downhole Tool

FIG. 1 is an isometric view of a first example downhole tool, according to some embodiments. A downhole tool 100 of FIG. 1 can be incorporated into various downhole operations. For instance, the downhole tool 100 can be part of a drill string for drilling operations. An example of such a system is depicted in FIG. 17A, which is further described below. The downhole tool 100 can also be part of a wireline system. An example of a wireline system is depicted in FIG. 17B, which is further described below. The downhole tool 100 includes a detector 108 that is housed within a collar 110.

Example embodiments can include emission of gamma rays into a surrounding formation. The gamma rays can be emitted from the downhole tool 100 itself or from a different component downhole or at the surface. The gamma rays can have a high enough energy to pass through the formation and be detected by the detector 108.

Figure 2:
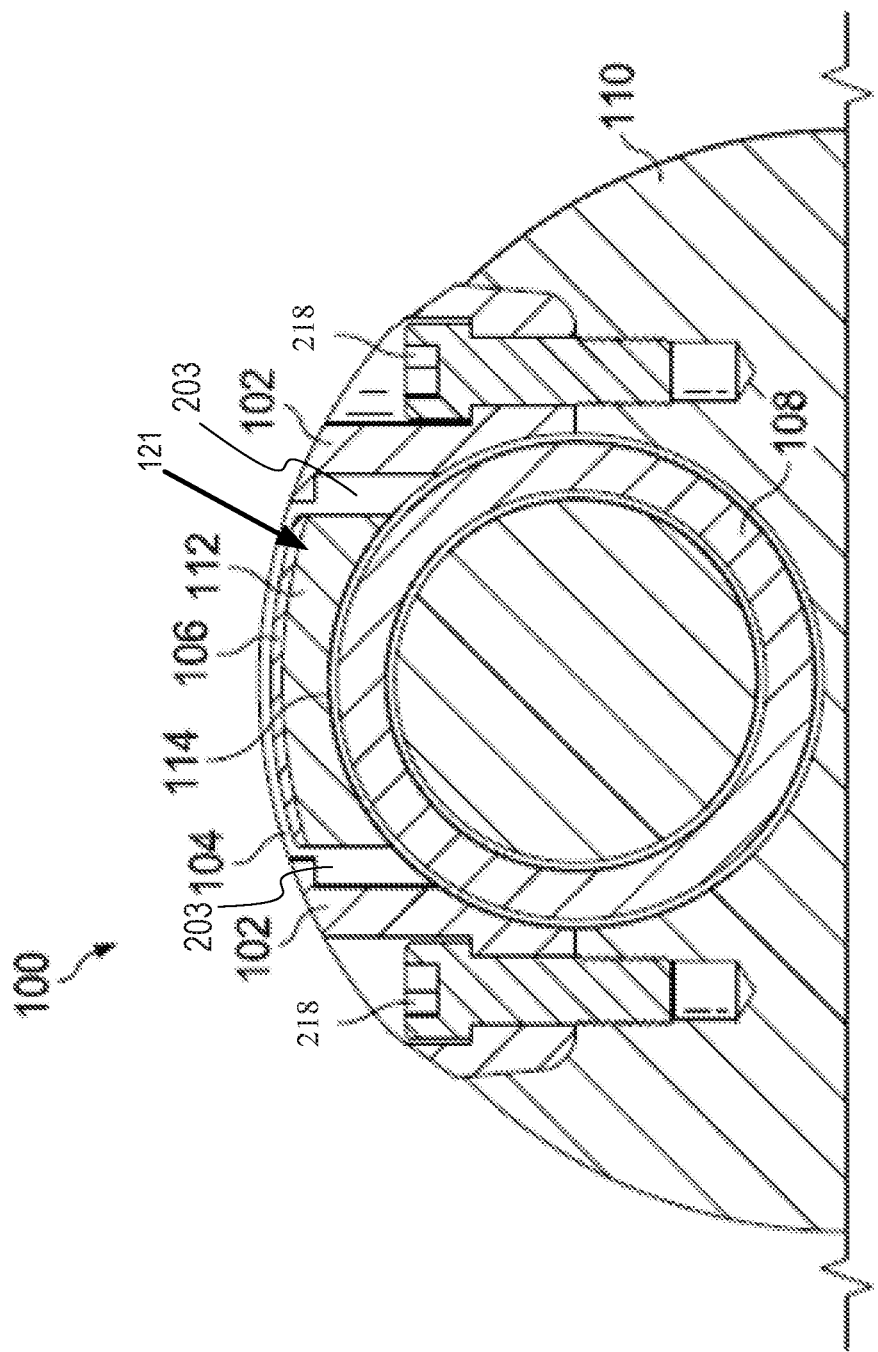
FIG. 2 is a cross sectional view of the example downhole tool of FIG. 1, according to some embodiments.
Figure 3:
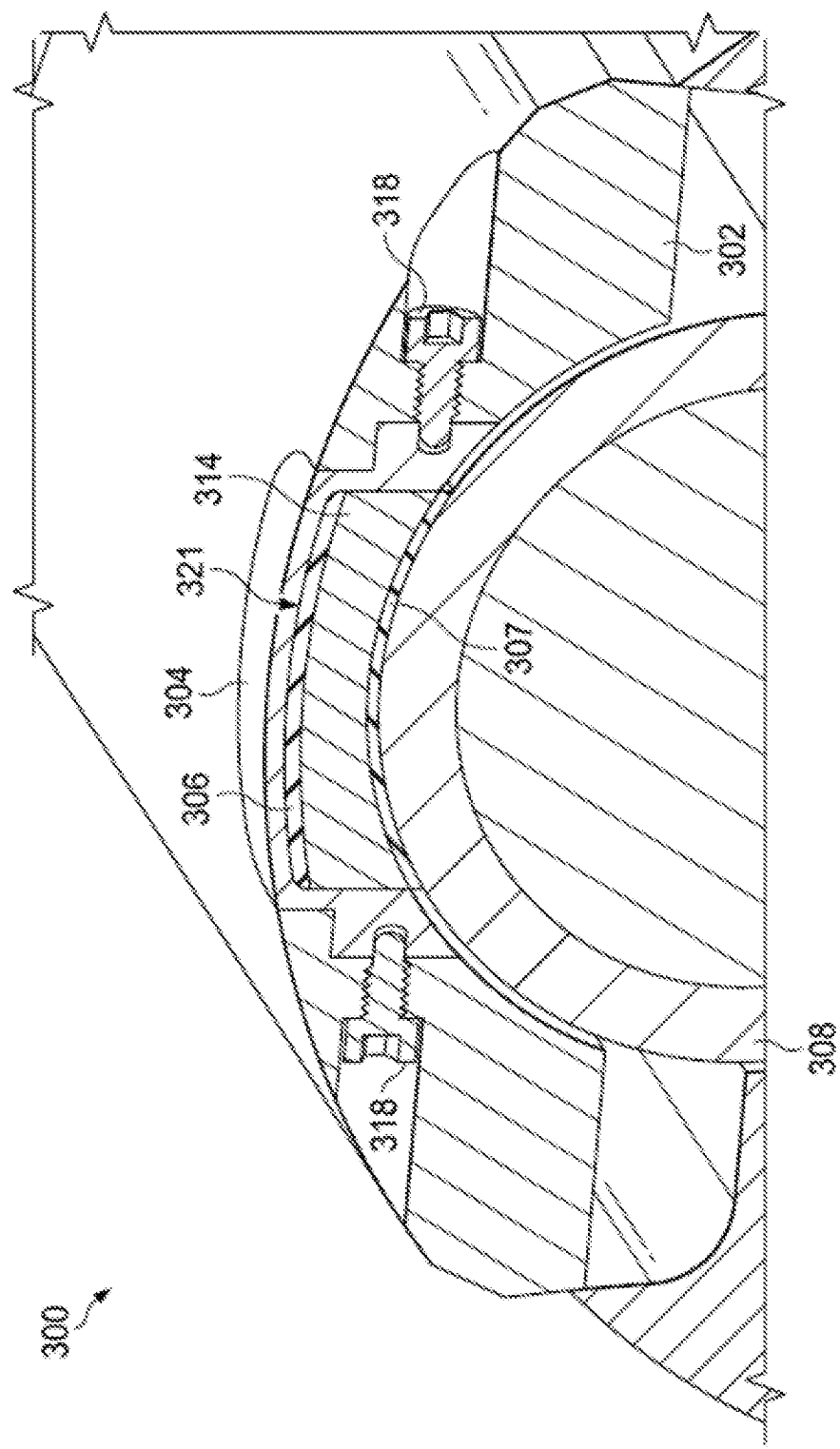
FIG. 3 is an isometric view of a second example downhole tool, according to some embodiments.

A sleeve 116 can be wrapped around the detector 108 to centralize the detector 108 in the collar 110. The sleeve 116 can be composed of any type of elastic material (such as rubber). A portion of the collar 110 can be cut out for placement of a window for passage of gamma rays from the subsurface formation for detection by the detector 108. A cover 102 can be positioned in the cutout of the collar 110. In some embodiments, the cover 102 includes openings or holes for fasteners. The cover 102 can hold the detector 108 in place by fasteners positioned in these openings or holes. An example embodiment of the cover 102, the fasteners, and the detector 108 are depicted in FIG. 2 and FIG. 3, which are further described below.

The cover 102 can be composed of different types of hard and/or high density materials (such as carbide, diamond coated material, etc.). Such materials of the cover 102 can attenuate gamma rays, resulting in inaccurate measurements. The cover 102 may have an opening cut out of the cover 102 to allow the gamma rays emitted from the detector 108 to travel with less attenuation. A window cap 104 can be positioned in this opening of the cover 102. The window cap 104 may be composed of a low-density, high strength material to allow gamma ray transmission with minimal attenuation while protecting the detector from harsh downhole conditions. Such materials include, but are not limited to, titanium or aluminum alloys. In some implementations, the window cap 104 may be composed of the same material as the cover 102.

In some embodiments, the cover 102 may not have an opening cut out of the cover 102. Rather, the cover 102 may have a decreased thickness at the location of the window core 121 to minimize attenuation of gamma rays. For example, a cavity may be present on the side of the cover 102 facing the detector. In such an embodiment, the window cap 104 is not needed.

A window core 121 can be positioned between the window cap 104 and the detector 108. In some embodiments, the window core 121 can be positioned between the cover 102 and the detector 108, where the cover 102 has a cavity on the side of the cover 102 facing the detector 108 and the window core 121 fits within the cavity. The window core 121 can be a composite window core having multiple materials. In some implementations, the window core 121 can include a middle material and at least one elastic material. For example, the window core 121 can include a middle material 114, an elastic material 106, and an elastic material 112. In some implementations, the window core 121 can include the middle material 114 and one elastic material. For example, the window core 121 can include the middle material 114 and the elastic material 106. The window core 121 can also include the middle material 114 and the elastic material 112. In some embodiments, the window core 121 may not include elastic materials, as described further below.

The middle material 114 may be composed of a low-density material to allow for less attenuation of the gamma rays. In some implementations, a stiffness of the middle material can be greater than a stiffness of the elastic material. For example, the middle material 114 may be composed of polyether ether ketone (PEEK) or plastic. Alternatively, the middle material 114 itself may be an elastic material.

FIG. 2 is a cross sectional view of the example downhole tool of FIG. 1, according to some embodiments. As shown in this example, the elastic material 106 is positioned between the middle material 114 and the window cap 104. The elastic material 112 is positioned between the middle material 114 and the detector 108. The elastic material 112 and 106 may provide sealing capability between the window cap 104 and the detector 108. The thickness of the elastic materials 106 and 112 may be such that when the cover 102 and window cap 104 are installed, there are essentially no gaps between the detector 108 and the middle material 114, and the middle material 114 and the window cap 104. Fasteners 218 can be used to fix or attach the cover 102 to the collar 110 of the downhole tool 100. In some embodiments, the window cap 104 may have flanges 203 that secure the window cap 104 and the window core 121 when the cover 102 is installed.

FIG. 3 is an isometric view of a second example downhole tool, according to some embodiments. A downhole tool 300 includes a detector 308. The detector 308 may be a gamma ray detector. The gamma rays can be emitted from the downhole tool 300 itself or from a different component downhole or at the surface. The gamma rays can have a high enough energy to pass through the formation, a window cap 304, and a window core 321, and be detected by the detector 308.

The window core 321 may be positioned between the window cap 304 and the detector 308. An elastic material 306 may be positioned between a middle material 314 and the window cap 304. An elastic material 307 may be positioned between the middle material 314 and the detector 308. Fasteners 318 can be used to secure the window cap 304 to the cover 302. The downhole tool 100 depicted in FIGS. 1-2 and the downhole tool 300 both include a detector, a window core, a window cap, and fasteners. However, the fasteners 218 of downhole tool 100 secure the cover 102 to the collar 110, and the flanges 203 secure the window core 121 and the window cap 104 in place. In contrast, the fasteners 318 of the downhole tool 300 secure the window cap 304 to the cover 302 to secure the window core 321 and the window cap 304 in place. Additionally, the fasteners 318 are inserted perpendicular to the fasteners 218. However, it should be noted that the fasteners 318 may be inserted at other angles, so long as the fasteners 318 secure the window cap 304 to the cover 302.

Figure 4:
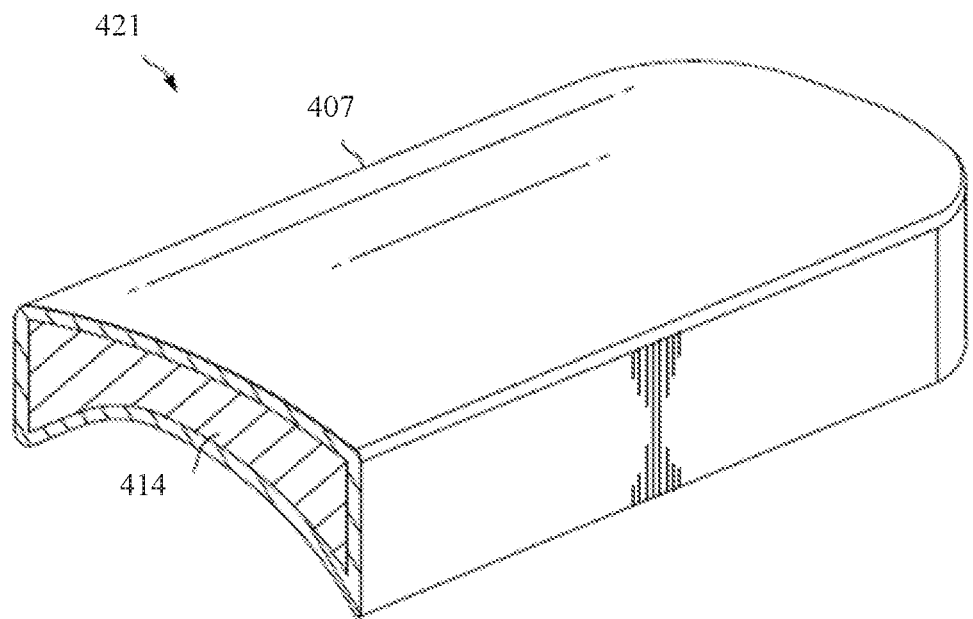
FIG. 4 is an isometric view of a configuration of a window core that includes a plastic material fully encapsulated by an elastic material, according to some embodiments.

FIG. 4 is an isometric view of a second example of a window core that includes a plastic material fully encapsulated by an elastic material, according to some embodiments. FIG. 4 depicts a window core 421 that is a composite of multiple materials. In this example, with reference to FIG. 1, the window core 421 has a middle material 414 that is encapsulated by an elastic material 407 to increase the sealing capability between the detector 108 and the window cap 104 by creating a seal between the cover 102 and surfaces of the middle material 414. In some embodiments, with reference to FIG. 1, the window core 421 may be positioned in a cavity in the cover 102. While described as a plastic material, the middle material 414 can be composed of other materials having a stiffness that is greater than a stiffness of the elastic material 407. For example, the middle material 414 can be composed of PEEK. Thus, the window core 121 depicted in FIGS. 1-2 and the window core 421 both include a middle material. However, while the window core 121 includes an elastic material on a front side and a back side of the middle material 114, the window core 421 includes an elastic material on all sides of the middle material 414.

Figure 5:
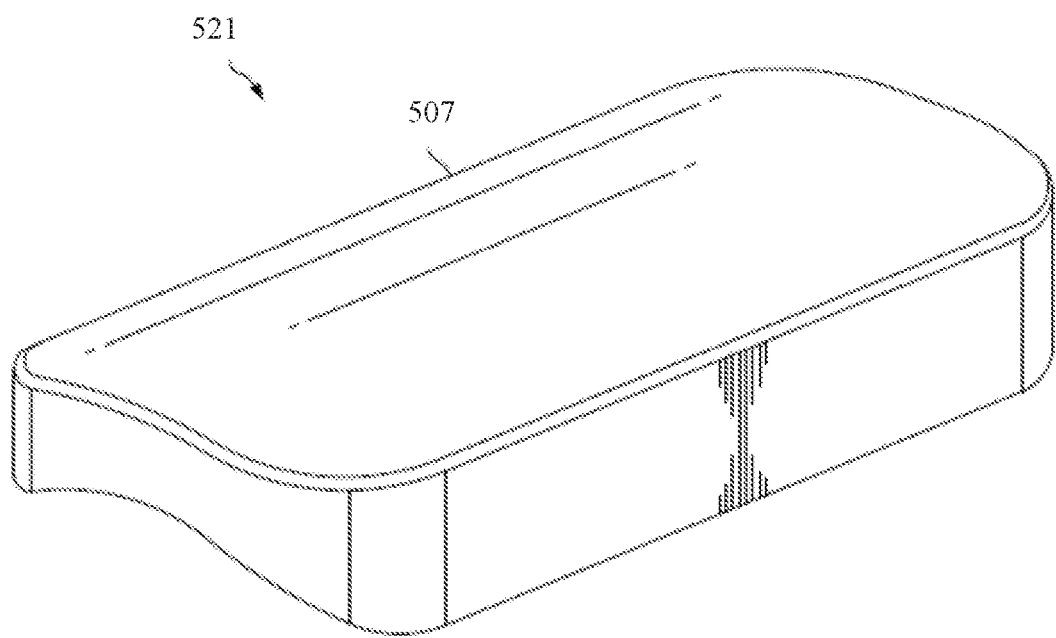
FIG. 5 is an isometric view of a third example of a window core that is made of a single material, according to some embodiments.

FIG. 5 is an isometric view of a third example of a window core that is made of a single material, according to some embodiments. FIG. 5 depicts a window core 521 that is composed of a single material 507. With reference to FIG. 1, the window core 521 may be positioned between the window cap 104 and the detector 108. In some embodiments, the material 507 may be an elastic material. In such embodiments, the window core 521 may create a seal between the cover 102 and the detector 108. Alternatively, the material 507 may be a plastic material or PEEK. In downhole tools lacking a window cap, the window core 521 may be positioned in a cavity in the cover 102. Thus, each of the window core 121, the window core 421, and the window core 521 can be positioned between the detector 108 and the window cap 104. In contrast to the window core 121 of FIGS. 1-2 and the window core 421 of FIG. 4, which are composite cores, the window core 521 is composed of a single material.

Figure 6:
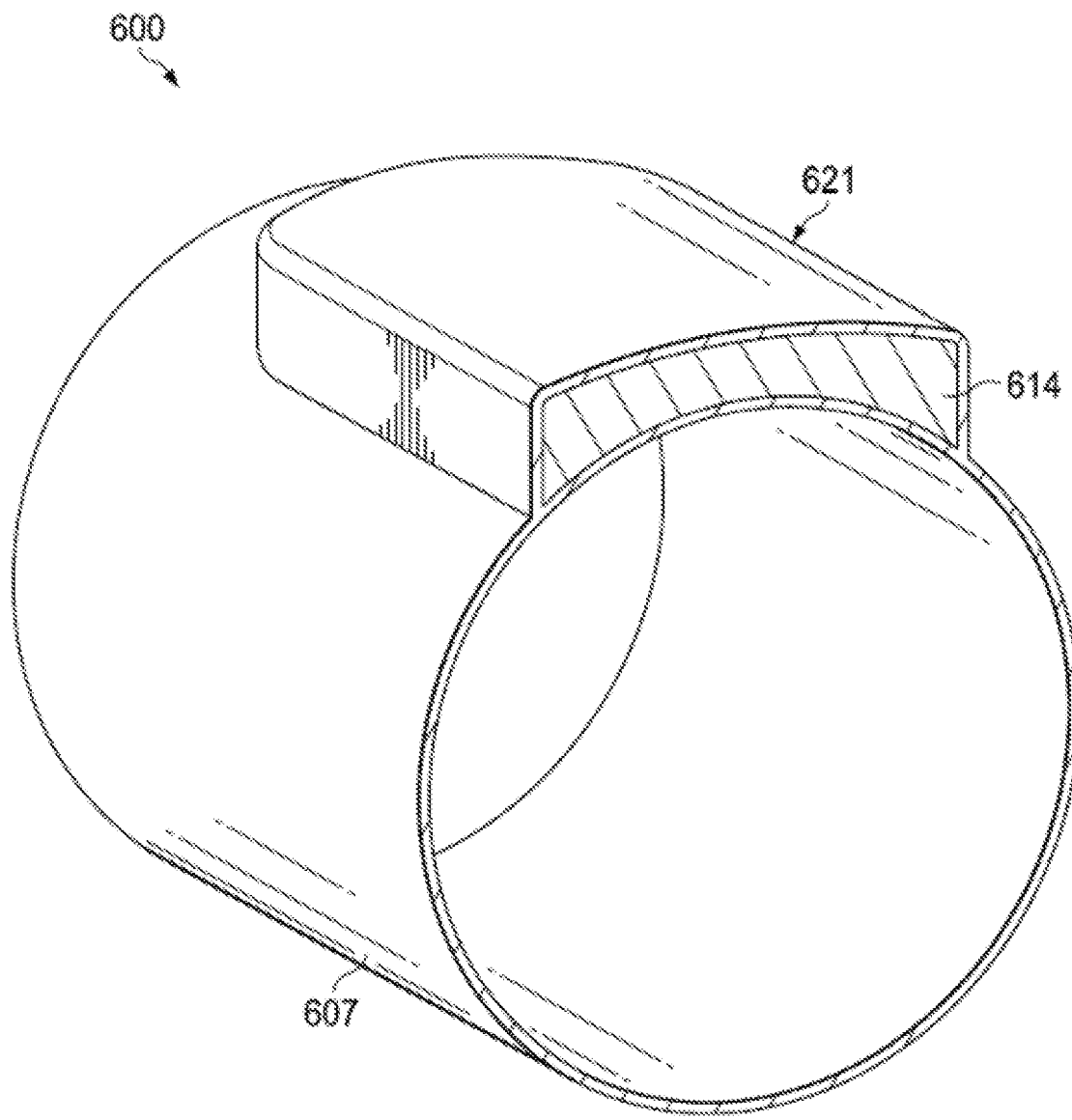
FIG. 6 is an isometric view of an example of a combined window core and sleeve, according to some embodiments.

FIG. 6 is an isometric view of an example of a combined window core and sleeve, according to some embodiments. A combined element 600 includes a window core 621 and a sleeve 607. With reference to FIG. 1, the window core 621 and the sleeve 607 may be used in place of the window core 121 and the sleeve 116, respectively. The sleeve 607 may be used to centralize the detector 108 in the collar 110. The sleeve 607 may have a window core 621 on the sleeve 607 positioned between the sleeve 607 and the window cap 104. In some embodiments, the window core 621 may be positioned between the sleeve 607 and the cover 102. A middle material 614 is encapsulated by the sleeve 607. In some implementations, the middle material 614 may be a low-density material that minimally attenuates gamma rays (such as a plastic), while the sleeve 607 is composed of an elastic material. In other implementations, the sleeve 607 and the middle material 614 may be composed of a same material. For example, both the sleeve 607 and the middle material 614 can be composed of an elastic material. In another example, both the sleeve 607 and the middle material 614 can be composed of a plastic.

In previous tools, plastic detection windows in the collar allowed for the transmission of gamma rays with minimal attenuation. However, those soft, low-density plastic windows are prone to damage under harsh downhole conditions, including high temperature and high pressure. Increased downhole temperatures result in thermal expansion of the plastic detection windows. At extremely high temperatures increased thermal expansion can cause increased stress in the material, compromising the integrity of the detection window. Further, the high-pressure downhole forces mud and other drilling fluids through gaps between detection windows and the tool housing. Over continued use, the gaps between the detection window and the tool housing increase in size. The result is an even greater ingress of fluid into the downhole tool and damage to the detection window. The compromised integrity of the detection window and the presence of fluid within the tool decreases the accuracy of measurements, as gamma rays are increasingly attenuated, and the tool must be recalibrated for each use. In addition to the decreased measurement accuracy, the tool must be replaced or maintained over time due to damage to the detection window and the tool housing.

Example Fasteners

The elimination of gaps between the detector and the downhole environment reduces the likelihood of mud or other drilling fluids penetrating through gaps between the window cap 104, the window core 121 and the detector 108 or between the cover 102 and the detector 108. However, there is still risk for fluid ingress in the case of fastener failure. Fasteners may fail due to excessive axial loading that occurs as a result of high dogleg and high drilling torque experienced during operations downhole. Fasteners may also fail due to excessive bending loading that occurs when the shape of the downhole tool deforms as a result of harsh downhole conditions.

Example fasteners for a downhole tool are now described with reference to FIGS. 7 and 8. One or more of the fasteners depicted in FIGS. 7 and 8 can be an example of the fasteners 218 of FIG. 2 or fasteners 318 of FIG. 3. The example fasteners are described in reference to the example downhole tool for gamma ray detection described above. However, these example fasteners can be used for other downhole tools or other applications/systems.

Figure 7:
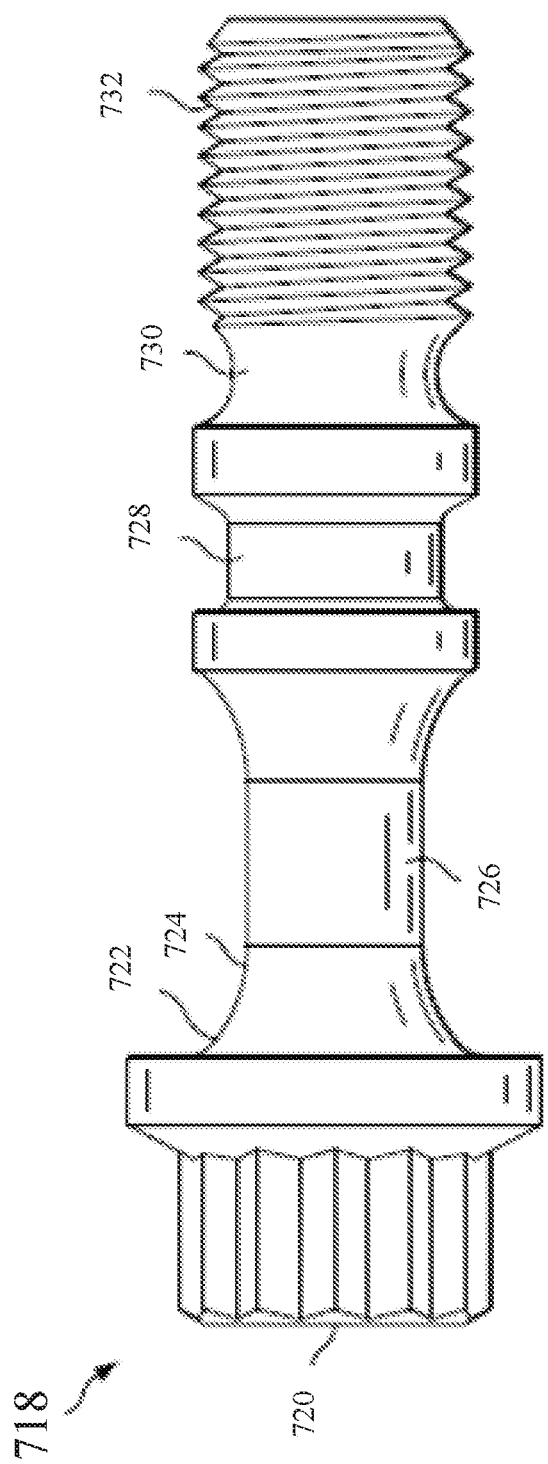
FIG. 7 is a side view of an example fastener having a waisted shank, according to some embodiments.

FIG. 7 is a side view of an example fastener having a waisted shank, according to some embodiments. A bolt 718 of FIG. 7 can include a bolt head 720, a shank 726, and threads 732. In some embodiments, the shank 726 can have a diameter that is smaller than a minor diameter of the threads 732. The shank 726 can have an end coupled to the bolt head 720. This end can include a multi-radii fillet that includes two radii, 722 and 724. The first radius 722 may be smaller than the second radius 724.

In some embodiments, the bolt 718 can include an O-ring groove 730 to allow for the installation of an O-ring to increase sealing capability. The bolt 718 can also include a thread relief groove 728. For example, if the bolt 718 includes the O-ring groove 730, the bolt 718 can also include a thread relief groove 730 to allow for ease of manufacturing. The diameter of the thread relief groove 730 may be smaller than the minor diameter of the threads 732. The diameter of the shank 726 may be smaller than a diameter of the thread relief groove 730.

Conventional bolts included stiff shanks capable of bearing high axial loads. In contrast, the example embodiment of the bolt 718 of FIG. 7 can include a bolt with a waisted shank and multi-radii fillet to reduce the stress concentration at the threads under bending loads. A bolt with a shank diameter that is less than the thread minor diameter can deform more under increased bending loads, reducing the stress concentration at the thread root.

Figure 8:
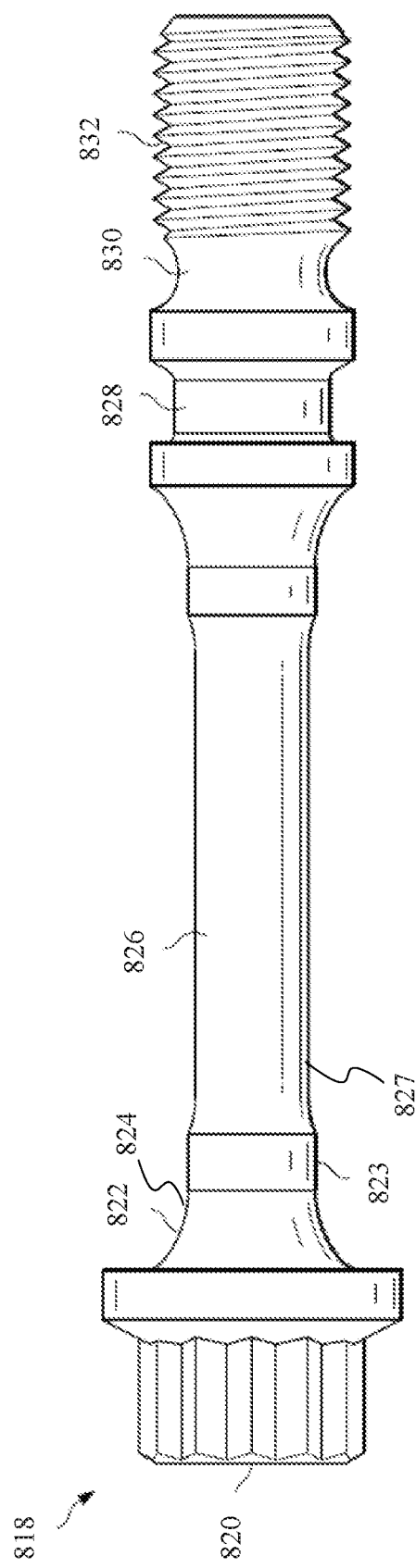
FIG. 8 is a side view of an example fastener having a multi-shank reduction, according to some embodiments.

FIG. 8 is a side view of an example fastener having a multi-shank reduction, according to some embodiments. A bolt 818 of FIG. 8 can include a bolt head 820, a shank 826, and threads 832. In some embodiments, the bolt 818 has a longer shank than the bolt 718 of FIG. 7. The shank 826 of the bolt 818 may have two shank diameters, 823 and 827. The shank diameter 823 can be greater than the shank diameter 827. The shank diameter 823 may also be smaller than the minor diameter of the threads 832. There may be a dual-radii fillet, with radii 822 and 824, between the bolt head 820 and the largest diameter shank 823. In example embodiments, dual-radii fillets may be used at each fillet location. For example, a dual-radii fillet can be used between the two shank diameters (the shank diameter 823 and the shank diameter 827).

In some embodiments, the bolt 818 can include an O-ring groove 828 to allow for the installation of an O-ring to increase sealing capability. The bolt 818 can also include a thread relief groove 830. For example, if the bolt 818 includes the O-ring groove 828, the bolt 818 can also include the thread relief groove 830 to allow for ease of manufacturing. The diameter of the thread relief groove 830 may be smaller than the minor diameter of the threads 832. The shank diameter 827 may be smaller than the diameter of the thread relief groove 830.

A shank (as depicted in FIG. 8) having multiple shank diameters or reductions can create a more uniform stress concentration distribution across the entire length of the bolt shank under loading. Additionally, a multi-radii fillet between the bolt head and the waisted shank can allow for even further reduction of stress concentrations under both axial and bending loads.

Example Anti-Rotation Fastener Assemblies

Fasteners with a reduced shank diameter and dual-radii fillet between different diameter segments can reduce high stress concentrations that can lead to premature failure. However, there are additional concerns regarding the use of threaded fasteners in conditions downhole. High vibrations produced during downhole operations can loosen threaded fasteners over time. Conventional anti-rotation fastener assemblies can be too large for use in compact applications or incompatible with low stretch bolts that need to maintain pretension during downhole operations. For example, self-locking washers with wedge angles add height to the fastener assembly. Additionally, the material used in self-locking washers with wedge angles need to be harder than the materials of the two components to be mated. Self-locking washers with wedge angles are not viable for use in downhole tools because the materials of the tools may be of a higher strength than the material of the washers. Other anti-rotation fastener assemblies can also compromise the strength of the bolt and pretension of the bolt. For example, a Castle nut and cotter pin assembly involves cutting into the bolt. This may compromise the pretension of the bolt and decrease the clamp force.

Figure 13:
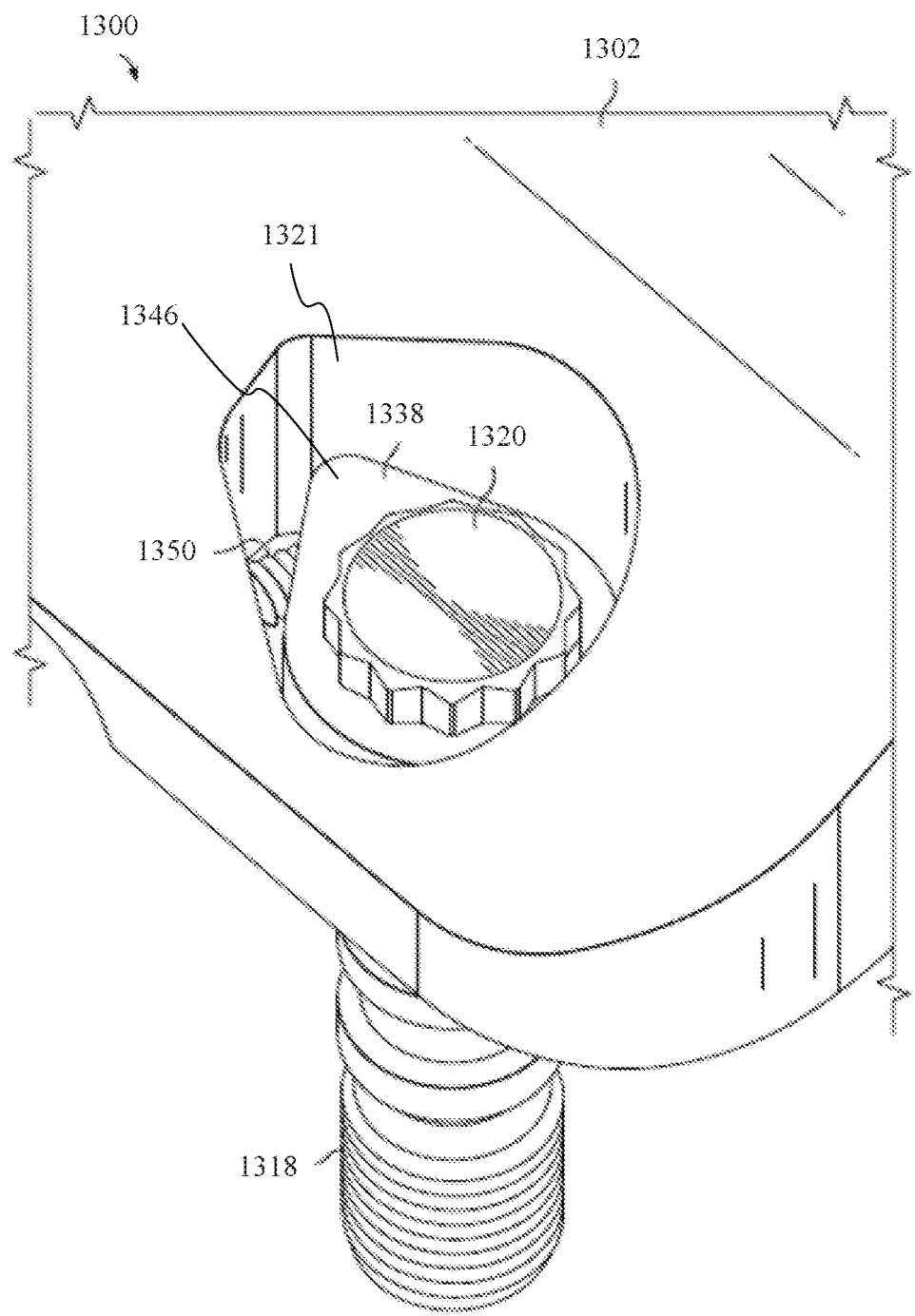
FIG. 13 is an isometric view of a second example anti-rotation fastener assembly, according to some embodiments.
Figure 14:
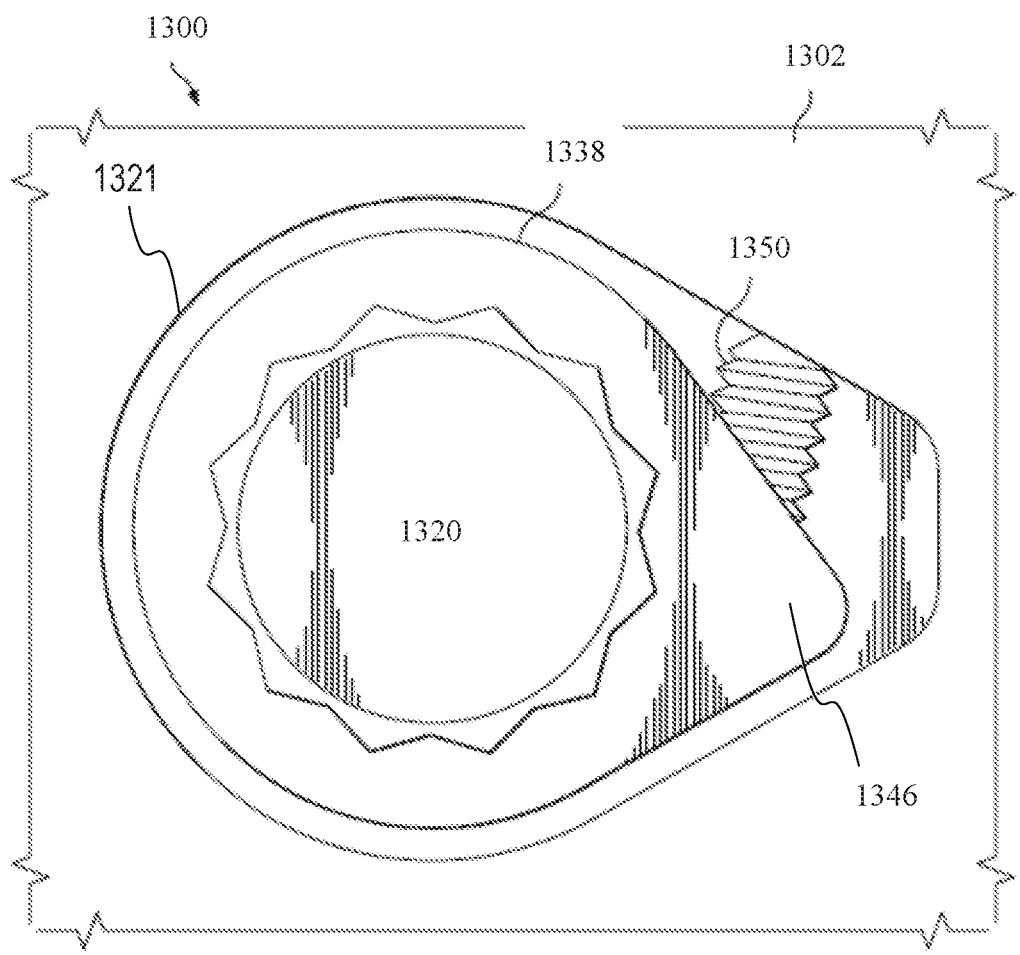
FIG. 14 is a top view of the second example anti-rotation fastener assembly of FIG. 13, according to some embodiments.
Figure 15:
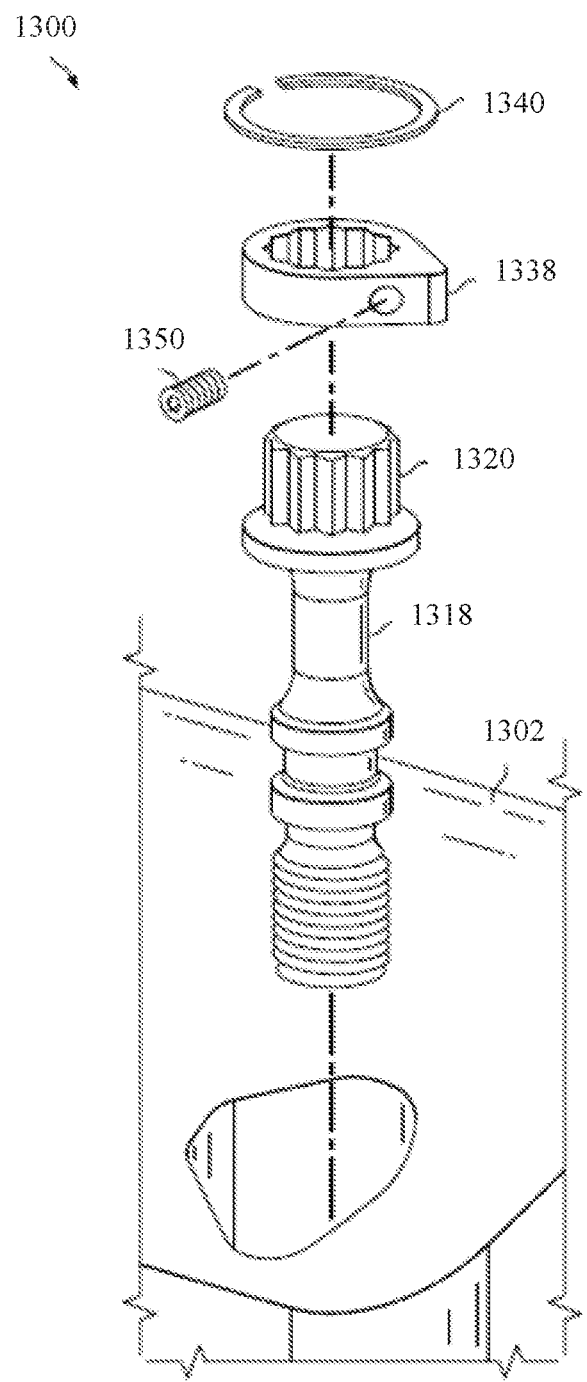
FIG. 15 is an exploded view of the second example anti-rotation fastener assembly of FIG. 13, according to some embodiments.

Some embodiments can be configured to reduce rotation of the fastener during use. Two example anti-rotation fastener assemblies are now described. FIGS. 9-12 depict a first example anti-rotation fastener assembly. FIGS. 13-15 depict a second example anti-rotation fastener assembly. One or both of these example anti-rotation fastener assemblies can be used in conjunction with any of the example fasteners described above. Also, these example anti-rotation fastener assemblies are described in reference to the example downhole tool for gamma ray detection described above. However, these example anti-rotation fastener assemblies can be used for other downhole tools or other applications/systems.

FIGS. 9-12 depict a first example anti-rotation fastener assembly, according to some embodiments. FIGS. 9-12 depict different views of an anti-rotation fastener assembly 900 used with a bolt 918 to secure a cover 902. In some embodiments, the anti-rotation fastener assembly 900 may be used with a bolt 918 to secure a window cap 304 to a cover 302, as seen in FIG. 3.

Figure 9:
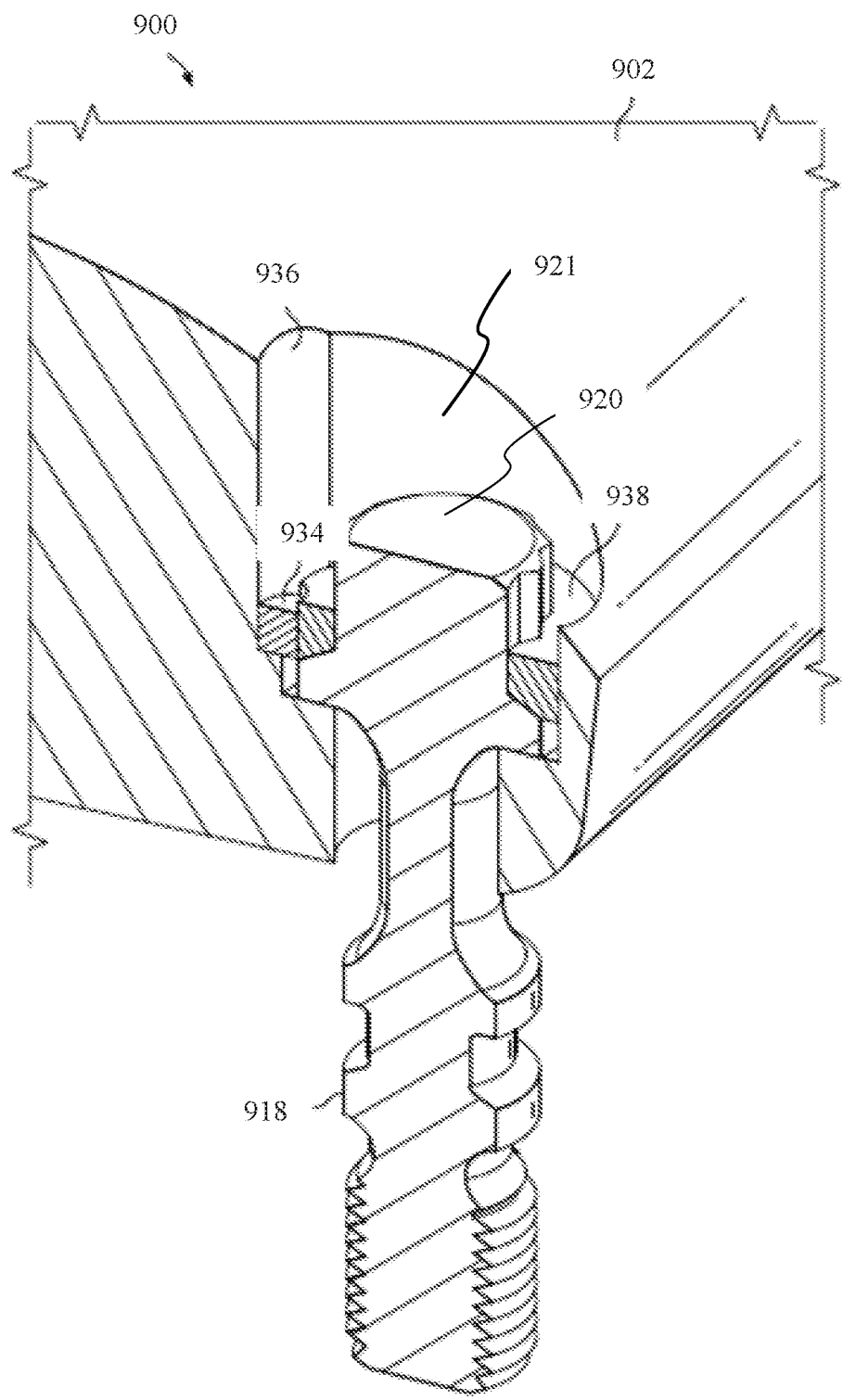
FIG. 9 is a cross sectional view of a first example anti-rotation fastener assembly, according to some embodiments.

FIG. 9 is a cross sectional view of a first example anti-rotation fastener assembly, according to some embodiments. The bolt 918 includes a bolt head 920. The assembly 900 includes a crown 938 and a pin or spherical ball (hereinafter "pin") 934. The cover 902 may have an opening (e.g., a counter-bore) 921 in which the bolt 918 is positioned when installed.

Figure 10:
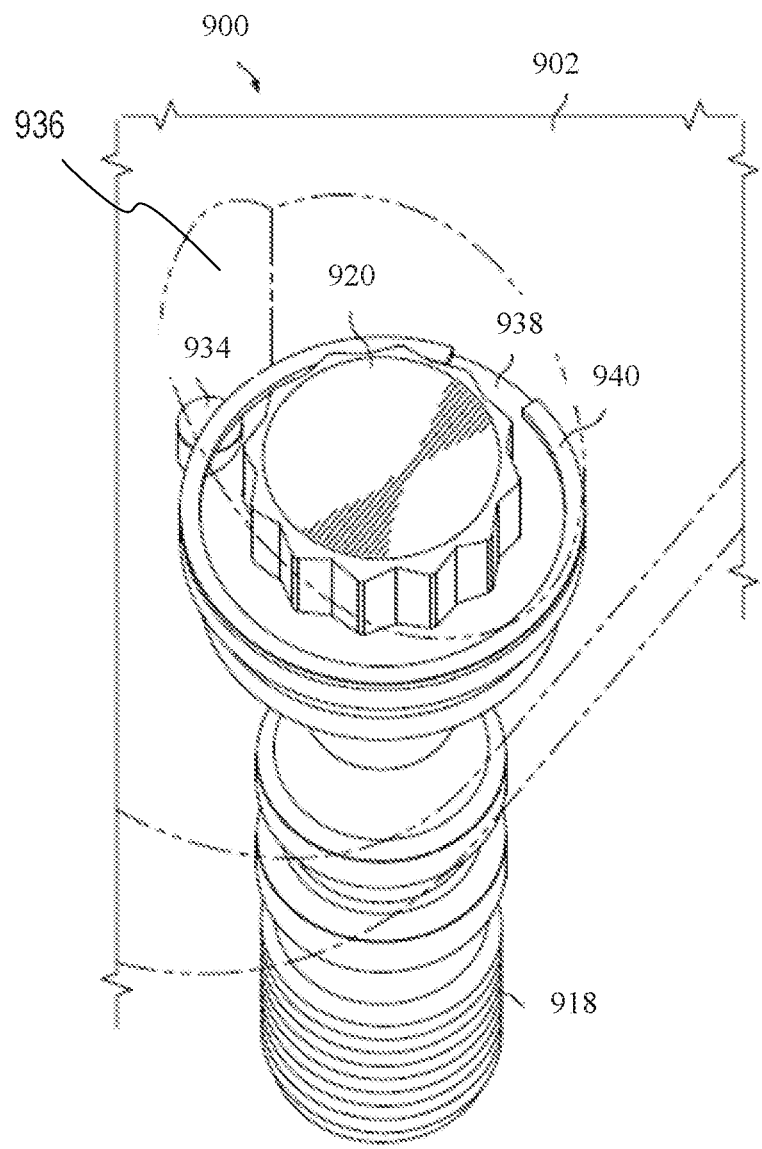
FIG. 10 is an isometric view of the first example anti-rotation fastener assembly of FIG. 9, according to some embodiments.

FIG. 10 is an isometric view of the first example anti-rotation fastener assembly of FIG. 9, according to some embodiments. The assembly 900 can also include a retaining ring 940. The retaining ring 940 may be used to hold the pin 934 in position.

Figure 11:
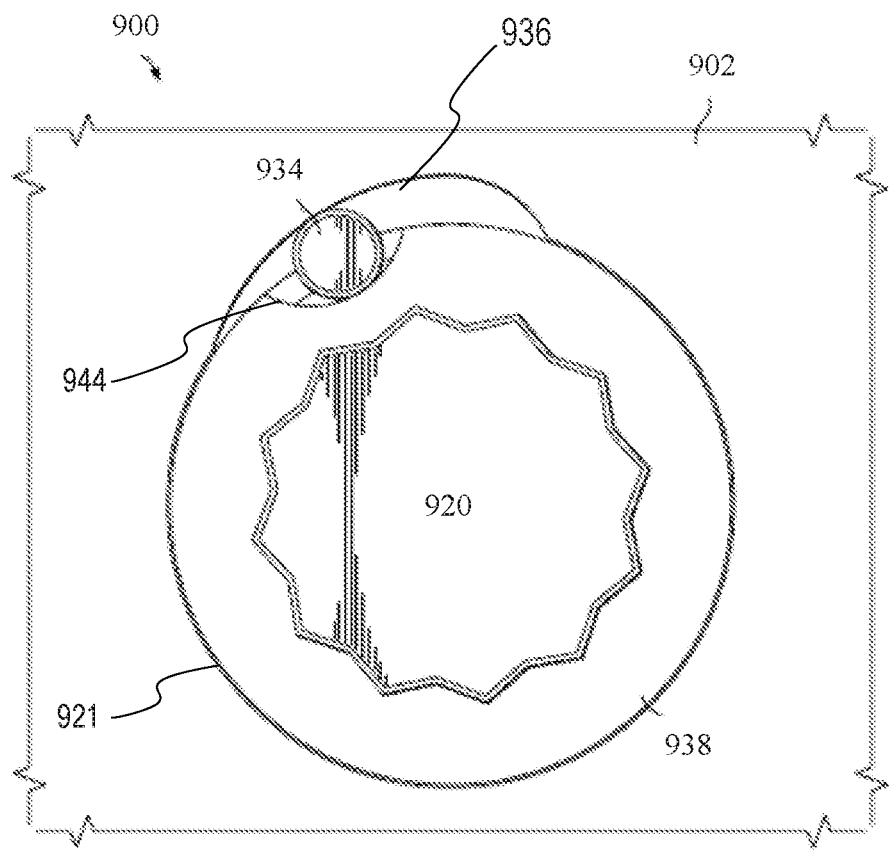
FIG. 11 is a normal view of the first example anti-rotation fastener assembly of FIG. 9, according to some embodiments.

FIG. 11 is a normal view of the first example anti-rotation fastener assembly of FIG. 9, according to some embodiments. The crown 938 may have an internal profile complimentary to the profile of the bolt head 920 and a substantially circular external profile having a notch 944. The opening 921 may have a groove 936 such that when the bolt 918 is placed in the opening 921 and the crown 938 is placed over the bolt head 920, the pin 934 may fit in the groove 936. The groove 936 in the opening 921 may vary in size to accommodate different sized pins 934. The pin 934 may be a hard or ductile material.

Figure 12:
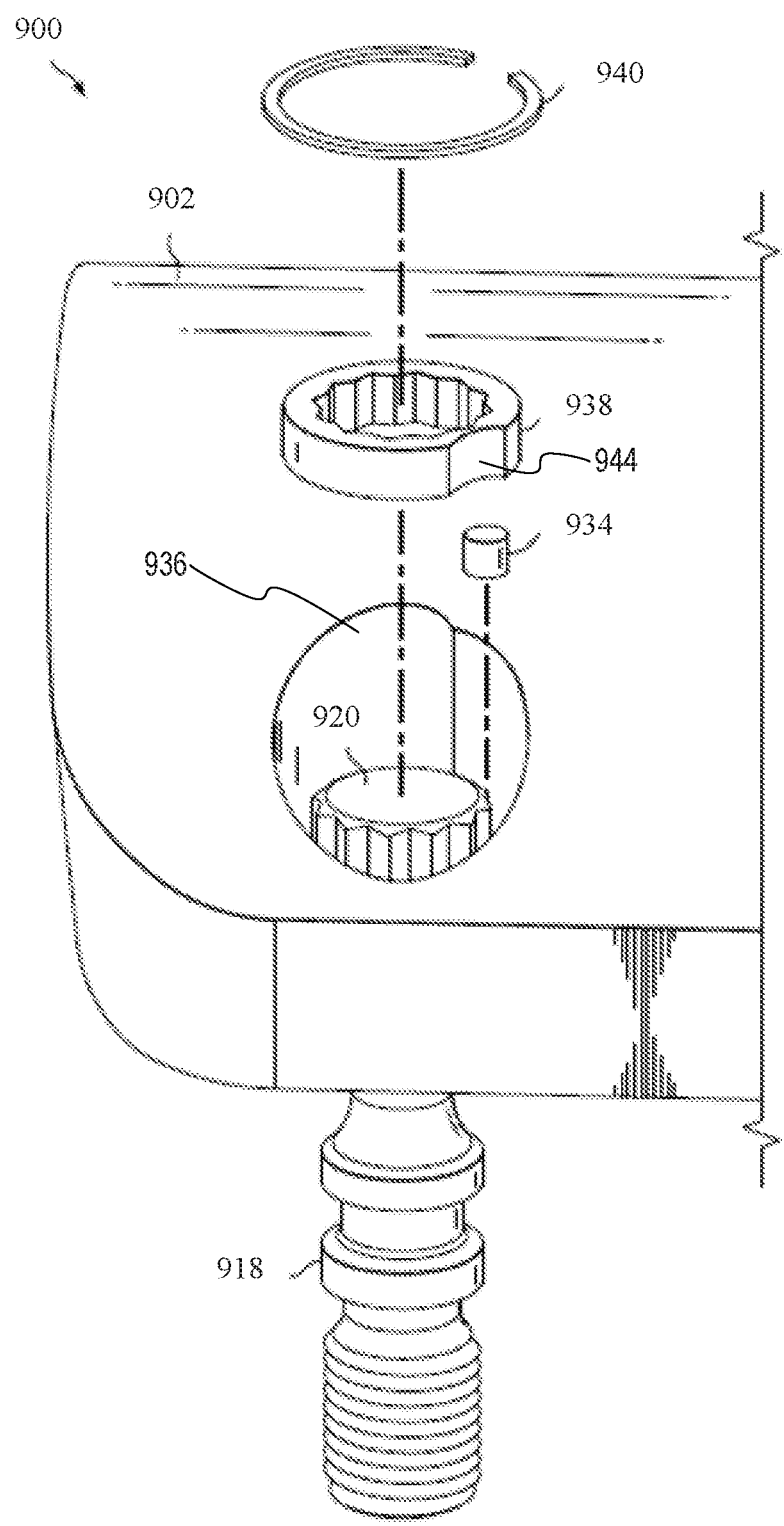
FIG. 12 is an exploded view of the first example anti-rotation fastener assembly of FIG. 9, according to some embodiments.

FIG. 12 is an exploded view of the first example anti-rotation fastener assembly of FIG. 9, according to some embodiments. The diameter of the pin 934 may be selected to minimize gaps between the pin 934 and the crown 938. If the pin 934 is a hard material, a range of acceptable diameters for the pin 934 may be determined using the dimensions of the profile of the groove 936, a pitch of the bolt 918, a stretch of the bolt 918, and/or the desired preload on the bolt 918. The selected diameter for the pin 934 may be the largest diameter of the range of diameters that can fit in the groove 936. The pin 934 is placed in the space between the notch 944 (depicted in FIG. 11) of the crown 938 and the groove 936 after the bolt 918 is torqued to a desired load and the crown 938 is placed over the bolt head 920. In some embodiments, the pin 934 may be made of a ductile material. After inserting the pin 934 in the groove 936, the pin 934 may be plastically deformed to fill the space between the notch of the crown 938 and the groove 936. A hammer and rod may be used to plastically deform the pin 934. A retaining ring 940 may also be used to prevent the pin 934 from dislodging.

FIGS. 13-15 depict a second example anti-rotation fastener assembly, according to some embodiments. FIGS. 13-15 depict different views of an anti-rotation fastener assembly 1300 used with a bolt 1318 to secure a cover 1302. In some embodiments, the anti-rotation fastener assembly 1300 may be used with a bolt 1318 to secure a window cap 304 to a cover 302, as seen in FIG. 3.

FIG. 13 is an isometric view of a second example anti-rotation fastener assembly, according to some embodiments. The bolt 1318 includes a bolt head 1320. The assembly 1300 includes a crown 1338 and a set screw 1350. The cover 1302 may have an opening (e.g., a counter-bore) 1321 in which the bolt 1318 is positioned when installed. The crown 1338 may have an internal profile complimentary to the profile of the bolt head 1320 and an external profile with a wedge 1346.

FIG. 14 is a top view of the second example anti-rotation fastener assembly of FIG. 13, according to some embodiments. A side of the crown 1338 facing the side of the opening 1321 may have a threaded hole to accommodate a set screw 1350 in the wedge 1346. The set screw 1350 may be inserted into the crown 1338 to minimize gaps between the wedge 1346 of the crown 1338 and the opening 1321 in the cover 1302.

FIG. 15 is an exploded view of the second example anti-rotation fastener assembly of FIG. 13, according to some embodiments. The assembly 1300 can also include a retaining ring 1340 (depicted in FIG. 15). The retaining ring 1340 may also be used to prevent the crown 1338 and the set screw 1350 from dislodging.

The anti-rotation fastener assemblies in accordance with example embodiments do not increase the footprint of the fastener assembly because the crowns fit over the bolt heads and are seated below the surface of the cover of the detector housing. Further, example embodiments do not compromise the pretension or stretch of the bolt during assembly.

Example Operations

Figure 16:
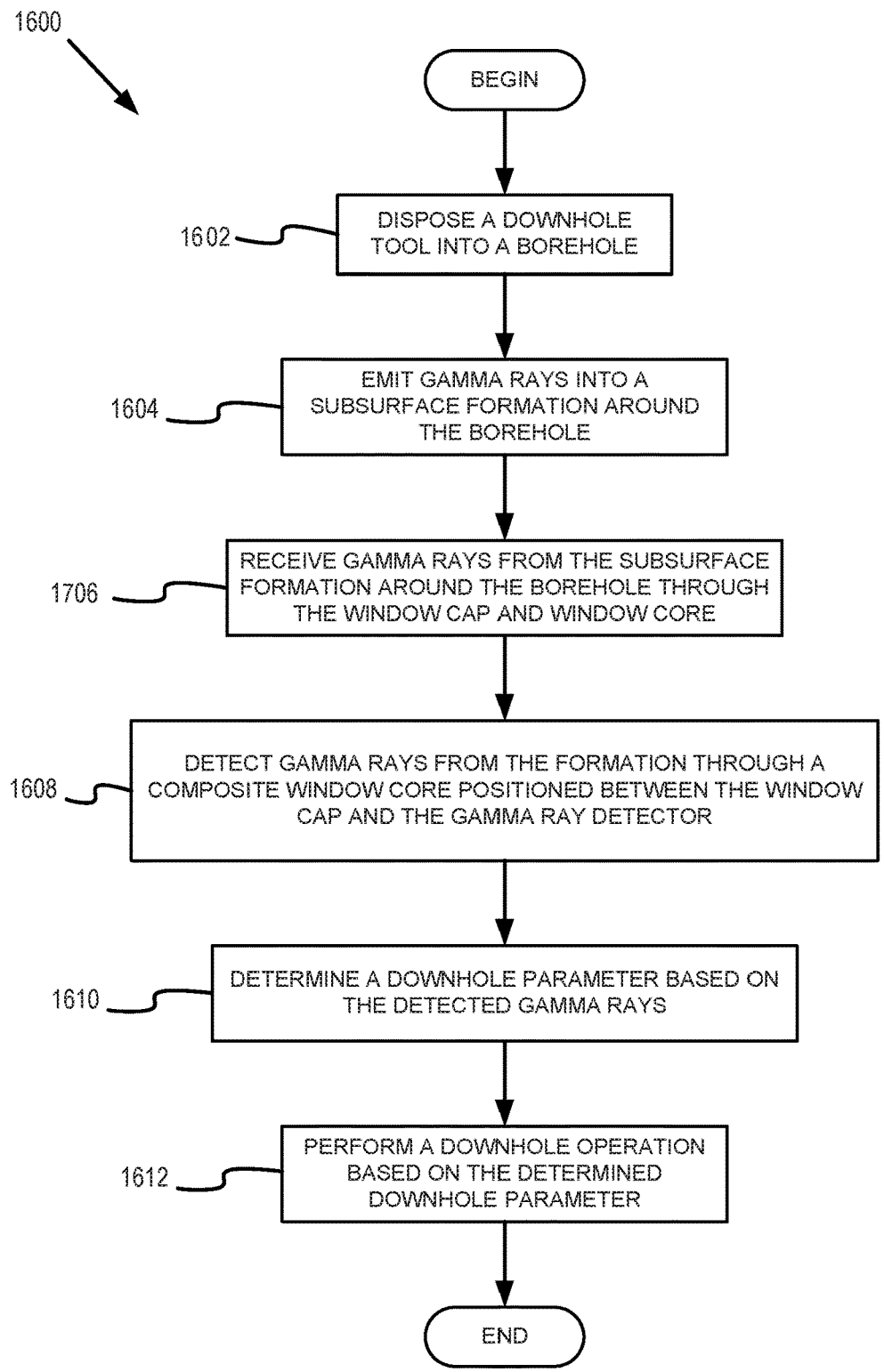
FIG. 16 is a flowchart of operations for performing gamma ray detection using a downhole tool, according to some embodiments.

FIG. 16 is a flowchart of operations for performing gamma ray detection using a downhole tool, according to some embodiments. Operations of a flowchart 1600 can be performed in many different downhole applications or systems. For example, operations of the flowchart 1600 can be performed in a drilling operation as depicted in FIG. 17A or a wireline operation as depicted in FIG. 17B, which are further described below. Operations of the flowchart 1600 start at block 1602.

At block 1602, a downhole tool is disposed into a borehole within a subsurface formation. The downhole tool may be a gamma ray detector. The downhole tool may be part of a drill string or wireline system. For example, the downhole tool can be disposed as part of a bottom hole assembly of a drill string during drilling operations.

At block 1604, gamma rays are emitted into the subsurface formation surrounding the borehole in which the detector is disposed. For example, the gamma ray detector can emit the gamma rays. The gamma rays can be emitted to interact with the surrounding formation.

At block 1606, the gamma ray detector receives gamma rays returning from the formation through a window in a cover of the downhole tool. As described above, the window in the cover of the downhole tool can include a window cap and a window core. The window core may be positioned behind the window cap relative to an external environment of the downhole tool. The window core may be positioned between the window cap and the detector. As described above, the window core may be composed of one or more elastic materials. A first elastic material may be disposed on a back side of the window cap. A second elastic material may be disposed on a part of the gamma ray detector facing the window cap. The first and second elastic materials may be the same elastic material. In other embodiments, the first and second elastic materials may be different elastic materials. The gamma rays from the formation return to the detector through the window cap and window core. The low density material of the window cap and the elastic materials of the window core allow the gamma rays to pass through with minimal attenuation.

At block 1608, the gamma ray detector detects gamma rays from the subsurface formation. As described above, the gamma ray detector detects the gamma rays through the window cap and window core (having the elastic material).

At block 1610, a downhole parameter of the formation is determined based at least in part off the detected gamma rays. This determination may be made downhole and/or at the surface. Examples of a downhole parameter can include formation porosity, lithology, permeability, density, etc.

At block 1612, a downhole operation is performed based on the determined downhole parameter. For example, if the downhole tool is part of a drill string, the drilling operation can be modified based on the determined downhole parameter. For example, the drilling operation to be modified can include rotational speed of the drill bit, drilling direction, weight on bit, etc.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 1406 and 1408 can be performed in parallel or concurrently.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

While the aspects of the disclosure are described with reference to various implementations and exploitations, it will be understood that these aspects are illustrative and that the scope of the claims is not limited to them. In general, techniques for gamma ray detection as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Example Systems

FIG. 17A is an example drilling system, according to some embodiments. A drilling platform 1702 supports a derrick 1704 having a traveling block 1706 for raising and lowering a drill string 1708. A top drive 1710 supports and rotates the drill string 1708 as the string is lowered through a well head 1712. The drill string's rotation (and/or a downhole motor) drives a drill bit 1714 to extend the borehole through subsurface earth formations 1721. Mud recirculation equipment 1716 draws drilling fluid from a retention pit 1724 and pumps it through a feed pipe 1718 to top drive 1710, through the interior of drill string 1808 to the drill bit 1814, through orifices in drill bit, through the annulus around drill string 1708 to a blowout preventer at the surface, and through a discharge pipe into the pit 1724. The drilling fluid transports cuttings from the borehole into the pit 1724 and aids in maintaining the borehole integrity.

One or more logging tools 1726 are integrated into a bottom hole assembly 1780 near the bit 1714. Suitable logging tools include formation fluid sampling tools, acoustic logging tools, electromagnetic resistivity tools, and nuclear magnetic resonance tools, among others. For example, the logging tools 1726 can include the downhole tool with a gamma ray detector, the fasteners, and/or the anti-rotation fastener assemblies, as described herein. Logging while drilling tools usually take the form of a drill collar, i.e., a thick-walled tubular that provides weight and rigidity to aid the drilling process. As the bit extends the borehole through the formations, the logging tool(s) collect measurements of formation characteristics. Other tools and sensors can also be included in the bottom hole assembly 1780 to gather measurements of various drilling parameters such as position, orientation, weight-on-bit, borehole diameter, etc. Control/telemetry module 1728 collects data from the various bottom hole assembly instruments (including position and orientation information) and stores them in internal memory. Selected portions of the data can be communicated to surface receivers 1730 by, e.g., mud pulse telemetry. Other logging-while drilling telemetry methods also exist and could be employed. For example, electromagnetic telemetry or through-wall acoustic telemetry can be employed with an optional repeater 1732 to extend the telemetry range. As another example, the drill string 1708 could be formed from wired drill pipe that enables waveforms or images to be transmitted to the surface in real time to enable quality control and processing to optimize the logging resolution. Most telemetry systems also enable commands to be communicated from the surface to the control and telemetry module to configure the operation of the tools.

FIG. 17B depicts an example wireline system, according to some embodiments. At various times during the drilling process, the drill string 1708 may be removed from the borehole for wireline logging operations. Once the drill string has been removed, logging operations can be conducted. A logging tool 1734 can be suspended by a cable 1742. The cable 1742 may or may not have conductors for transporting power to the tool and telemetry from the tool to the surface. The logging tool 1734 may have pads 1736 and/or centralizing springs to maintain the tool near the axis of the borehole as the logging tool 1734 is pulled uphole. The logging tool 1734 can include the downhole tool with a gamma ray detector, the fasteners, and/or the anti-rotation fastener assemblies, as described herein. A logging facility 1744 collects measurements from the logging tool 1734 and includes a computer system for processing and storing the measurements gathered by the logging tool 1734.

Example Embodiments

Embodiment 1: A downhole tool comprising a window cap located in a cover that is positioned between an electromagnetic radiation detector in the downhole tool and a geological formation into which a borehole is formed and where the downhole tool is to be positioned, the electromagnetic radiation detector to detect an electromagnetic radiation from the geological formation, and a window core positioned behind the window cap relative to an external environment of the downhole tool, wherein the window core is positioned between the window cap and the electromagnetic radiation detector.

Embodiment 2: The downhole tool of Embodiment 1, wherein the window core comprises a first elastic material disposed on a back side of the window cap facing the electromagnetic radiation detector and a second elastic material disposed on a part of the electromagnetic radiation detector to receive the electromagnetic radiation and positioned to face the window cap.

Embodiment 3: The downhole tool of Embodiment 2, wherein the window core comprises a middle material positioned between the first elastic material and the second elastic material, wherein the middle material is composed of a material having a stiffness that is greater than a stiffness of the first elastic material and a stiffness of the second elastic material.

Embodiment 4: The downhole tool of Embodiment 1, wherein the window core comprises a middle material and an elastic material enclosing the middle material, wherein the middle material is composed of a material having a stiffness that is greater than a stiffness of the elastic material.

Embodiment 5: The downhole tool of Embodiment 1, wherein the window core is composed of an elastic material.

Embodiment 6: The downhole tool of Embodiment 1, wherein the window core comprises a middle material and an elastic material enclosing the middle material and wrapping around the electromagnetic radiation detector, wherein the middle material is composed of a material having a stiffness that is greater than a stiffness of the elastic material.

Embodiment 7: The downhole tool of any one of Embodiments 3, 4, or 6, wherein the middle material is composed of a plastic material.

Embodiment 8: The downhole tool of any one of Embodiments 1-7, wherein an external face of the window core is adjacent to a back side of the window cap, the back side being opposite of an external face of the window cap, wherein the window core has a first side and a second side that is opposite the first side, the first side and the second side of the window core being adjacent to the external face to the external face, and wherein the window cap has a first flange covering the first side of the window core and a second flange cover the second side of the window core.

Embodiment 9: The downhole tool of any one of Embodiments 1-8, wherein the electromagnetic radiation comprises gamma rays.

Embodiment 10: The downhole tool of any one of Embodiments 1-9, wherein a thickness of the window cap is less than a thickness of the cover.

Embodiment 11: A well bore system comprising a drill string, comprising a drill bit to drill a borehole and a bottom hole assembly positioned above the drill bit, the bottom hole assembly having a downhole tool, wherein the downhole tool comprises an electromagnetic radiation detector to detect electromagnetic radiation from a geological formation into which the borehole is formed where the downhole tool is to be positioned, a cover positioned between the electromagnetic radiation detector and the geological formation, wherein a window is positioned in the cover, a window cap, a window core positioned behind the window cap relative to an external environment of the downhole tool, wherein the window core is positioned between the window cap and the electromagnetic detector.

Embodiment 12: The well bore system of Embodiment 11, wherein the window core comprises a first elastic material disposed on a back side of the window cap facing the electromagnetic radiation detector and a second elastic material disposed on a part of the electromagnetic radiation detector to receive the electromagnetic radiation through the window and positioned to face the window cap.

Embodiment 13: The well bore system of Embodiment 12, wherein the window core further comprises a middle material positioned between the first elastic material and the second elastic material, wherein the middle material is composed of a material having a stiffness that is greater than a stiffness of the first elastic material and a stiffness of the second elastic material.

Embodiment 14: The well bore system of Embodiment 11, wherein the window core comprises a middle material and an elastic material enclosing the middle material, wherein the middle material is composed of a material having a stiffness that is greater than a stiffness of the elastic material.

Embodiment 15: The well bore system of Embodiment 11, wherein the window core is composed of an elastic material.

Embodiment 16: The well bore system of Embodiment 11, wherein the window core comprises a middle material and an elastic material enclosing the middle material and wrapping around the electromagnetic radiation detector; wherein the middle material is composed of a material having a stiffness that is greater than a stiffness of the elastic material.

Embodiment 17: The well bore system of any one of Embodiments 11-16, wherein a thickness of the window cap is less than a thickness of the cover.

Embodiment 18: A method comprising disposing a downhole tool into a borehole created in a subsurface formation, emitting gamma rays into the subsurface formation, receiving the gamma rays from the subsurface formation by a gamma ray detector through a window in a cover of the downhole tool, wherein the window includes a window cap and a window core behind the window cap relative to an external environment of the downhole tool, wherein the window core is positioned between the window cap and the gamma ray detector, and detecting, by the gamma ray detector, the gamma rays from the subsurface formation.

Embodiment 19: The method of Embodiment 18, wherein the window core comprises a first elastic material disposed on a back side of the window cap facing the gamma ray detector and a second elastic material disposed on a part of the gamma ray detector to receive the gamma rays through the window and positioned to face the window cap, and wherein the window core comprises a middle material positioned between the first elastic material and the second elastic material, wherein the middle material is composed of a material having a stiffness that is greater than a stiffness of the first elastic material and a stiffness of the second elastic material.

Embodiment 20: The method of Embodiments 18 or 19, further comprising determining a downhole parameter based on the detected gamma rays and performing a downhole operation based on the determined downhole parameter.

Embodiment 21: The downhole tool of any one of Embodiments 1-10, further comprising at least one fastener to be positioned in the cover to secure the electromagnetic radiation detector in position in the downhole tool, wherein the at least one fastener comprises a head, a threaded section, and a shank to connect the head to the threaded section, wherein a diameter of the shank is less than a diameter of the threaded section.

Embodiment 22: The downhole tool of Embodiment 21, wherein the shank comprises an end connected to the head, wherein the end comprises multi fillet radii.

Embodiment 23: The downhole tool of Embodiments 20 or 21, further comprising a crown to be positioned to encircle and to engage with the head, wherein the crown includes an outer portion having a cut-out, and a lock element to be inserted from a top of a cut-out groove of the opening of the cover and into the cut-out of the outer portion of the crown.

Embodiment 24: The downhole tool of Embodiment 23 wherein the lock element comprises at least one of a pin and a ball.

Embodiment 25: The downhole tool of Embodiments 23 or 24, wherein the cut-out groove of the opening of the cover is wider than the cut-out of the outer portion of the crown.

Embodiment 26: The downhole tool of any one of Embodiments 23-25, wherein the lock element is composed of a deformable material.

Embodiment 27: The downhole tool of Embodiments 21 or 22, further comprising a crown to be positioned to encircle and to engage with the head, wherein the crown includes an outer portion having a cut-out, wherein a side the crown that is nonparallel with a longitudinal axis of the opening includes a hole, and a lock element to be inserted into the hole in the side of the crown.

Embodiment 28: The downhole tool of Embodiment 27, wherein the hole in the side of the crown is a threaded hole and the lock element comprises a screw.

Use of the phrase "any one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A downhole tool comprising:

a collar;
an electromagnetic radiation detector positioned within the collar, the electromagnetic radiation detector to detect an electromagnetic radiation from a geological formation into which a borehole is formed and where the downhole tool is to be positioned;
a cover in an opening of the collar, the cover positioned between the electromagnetic radiation detector and the geological formation, wherein the cover comprises materials that attenuate electromagnetic radiation;
a window cap positioned in an opening of the cover and comprising a material capable of allowing electromagnetic radiation transmission therethrough; and
a window core positioned behind the window cap relative to an external environment of the downhole tool, wherein the window core is positioned between the window cap and the electromagnetic radiation detector.

2. The downhole tool of claim 1, wherein the window core comprises:
a first elastic material disposed on a back side of the window cap facing the electromagnetic radiation detector; and
a second elastic material disposed on a part of the electromagnetic radiation detector to receive the electromagnetic radiation and positioned to face the window cap.

3. The downhole tool of claim 2, wherein the window core further comprises:
a middle material positioned between the first elastic material and the second elastic material, wherein the middle material is composed of a material having a stiffness that is greater than a stiffness of the first elastic material and a stiffness of the second elastic material.

4. The downhole tool of claim 3, wherein the middle material is composed of a material having a density less than a density of the first elastic material and a density of the second elastic material.

5. The downhole tool of claim 1, wherein the window core comprises:
a middle material; and
an elastic material enclosing the middle material, wherein the middle material is composed of a material having a stiffness that is greater than a stiffness of the elastic material.

6. The downhole tool of claim 1, wherein the window core is composed of an elastic material.

7. The downhole tool of claim 1, wherein the window core comprises:
a middle material; and
an elastic material enclosing the middle material and wrapping around the electromagnetic radiation detector, wherein the middle material is composed of a material having a stiffness that is greater than a stiffness of the elastic material.

8. The downhole tool of claim 1, wherein a thickness of the window cap is less than a thickness of the cover.

9. The downhole tool of claim 1,
wherein an external face of the window core is adjacent to a back side of the window cap, the back side being opposite of an external face of the window cap,
wherein the window core has a first side and a second side that is opposite the first side, the first side and the second side of the window core being adjacent to the external face, and
wherein the window cap has a first flange covering the first side of the window core and a second flange covering the second side of the window core.

10. The downhole tool of claim 1, wherein the electromagnetic radiation comprises gamma rays.

11. A well bore system comprising:
a drill string comprising,
a drill bit to drill a borehole; and
a bottom hole assembly positioned above the drill bit, the bottom hole assembly having a downhole tool, wherein the downhole tool comprises,
a collar;
an electromagnetic radiation detector positioned within the collar, the electromagnetic radiation detector to detect electromagnetic radiation from a geological formation into which the borehole is formed where the downhole tool is to be positioned;
a cover in an opening of the collar and positioned between the electromagnetic radiation detector and the geological formation, wherein a window is positioned in the cover;
a window cap for the window, the window cap comprising a material capable of allowing electromagnetic radiation transmission therethrough; and
a window core positioned behind the window cap relative to an external environment of the downhole tool, wherein the window core is positioned between the window cap and the electromagnetic radiation detector.

12. The well bore system of claim 11, wherein the window core comprises,
a first elastic material disposed on a back side of the window cap facing the electromagnetic radiation detector; and
a second elastic material disposed on a part of the electromagnetic radiation detector to receive the electromagnetic radiation through the window and positioned to face the window cap.

13. The well bore system of claim 12, wherein the window core further comprises:
a middle material positioned between the first elastic material and the second elastic material, wherein the middle material is composed of a material having a stiffness that is greater than a stiffness of the first elastic material and a stiffness of the second elastic material.

14. The well bore system of claim 11, wherein the window core comprises:
a middle material; and
an elastic material enclosing the middle material, wherein the middle material is composed of a material having a stiffness that is greater than a stiffness of the elastic material.

15. The well bore system of claim 11, wherein the window core is composed of an elastic material.

16. The well bore system of claim 11, wherein the window core comprises:
a middle material; and
an elastic material enclosing the middle material and wrapping around the electromagnetic radiation detector, wherein the middle material is composed of a material having a stiffness that is greater than a stiffness of the elastic material.

17. The well bore system of claim 11, wherein a thickness of the window cap is less than a thickness of the cover.

18. A method comprising:
disposing a downhole tool into a borehole created in a subsurface formation, the downhole tool comprising:
a collar;

a gamma ray detector positioned within the collar, the gamma ray detector to detect an electromagnetic radiation from a geological formation into which a borehole is formed and where the downhole tool is to be positioned;

a cover in opening of the collar, the cover positioned between the gamma ray detector and the geological formation, wherein the cover comprises materials that attenuate electromagnetic radiation;

a window cap positioned in a window in an opening of the cover and comprising a material capable of allowing gamma ray transmission therethrough; and a window core positioned behind the window cap relative to an external environment of the downhole tool, wherein the window core is positioned between the window cap and the gamma ray detector;

emitting gamma rays into the subsurface formation;

receiving the gamma rays from the subsurface formation by the gamma ray detector through the window; and detecting, by the gamma ray detector, the gamma rays from the subsurface formation.

19. The method of claim 18, wherein the window core comprising a first elastic material disposed on a back side of the window cap facing the gamma ray detector and a second elastic material disposed on a part of the gamma ray detector to receive the gamma rays through the window and positioned to face the window cap; and wherein the window core comprises a middle material positioned between the first elastic material and the second elastic material, wherein the middle material is composed of a material having a stiffness that is greater than a stiffness of the first elastic material and a stiffness of the second elastic material.

20. The method of claim 18, further comprising:

determining a downhole parameter based on the detected gamma rays; and performing a downhole operation based on the determined downhole parameter.

* * * * *